United States Patent
Naraharisetti et al.

(10) Patent No.: US 10,720,043 B2
(45) Date of Patent: *Jul. 21, 2020

(54) SYSTEMS AND METHODS FOR GENERATING A GRAPHICAL REPRESENTATION OF A FIRE SYSTEM NETWORK AND IDENTIFYING NETWORK INFORMATION FOR PREDICTING NETWORK FAULTS

(71) Applicant: Honeywell International Inc., Morris Plains, NJ (US)

(72) Inventors: Kanaka Nagendra Prasad Naraharisetti, Bangalore (IN); Kiran Reddy Singam, Bangalore (IN); RajeshBabu Nalukurthy, Bangalore (IN); Balamurugan Venkatesh, Hosur (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/390,936

(22) Filed: Apr. 22, 2019

(65) Prior Publication Data

US 2019/0251833 A1 Aug. 15, 2019

Related U.S. Application Data

(63) Continuation of application No. 15/257,253, filed on Sep. 6, 2016, now Pat. No. 10,269,236.

(51) Int. Cl.
*G08B 29/02* (2006.01)
*H04L 12/24* (2006.01)
(Continued)

(52) U.S. Cl.
CPC ............... *G08B 29/02* (2013.01); *G06F 8/65* (2013.01); *G06F 8/71* (2013.01); *H04L 41/065* (2013.01); *H04L 41/12* (2013.01)

(58) Field of Classification Search
None
See application file for complete search history.

(56) References Cited

U.S. PATENT DOCUMENTS 4,792,946 A * 12/1988 Mayo ................... G08B 25/009
370/245
5,189,394 A * 2/1993 Walter ................... G08B 25/14
340/286.14
(Continued)

FOREIGN PATENT DOCUMENTS

| WO | 2011023123 A1 | 3/2011 |
| WO | 2012052890 A1 | 4/2012 |
| WO | 2012025773 A1 | 3/2013 |

OTHER PUBLICATIONS

Communication Pursuant to Article 94(3) EPC from related European Application No. 17180584.9, dated Jul. 10, 2019, 5 pages.
(Continued)

*Primary Examiner* — Steven Lim
*Assistant Examiner* — Muhammad Adnan
(74) *Attorney, Agent, or Firm* — Brooks, Cameron & Huebsch, PLLC

(57) ABSTRACT

Systems and methods for generating a graphical representation of a fire system network and identifying network information for predicting network faults are provided. Some methods can include extracting at least one network parameter from a network board of at least one a plurality of nodes in a fire system network and using the extracted at
(Continued)

least one network parameter to generate a topology map that graphically represents a physical connectivity structure of the plurality of nodes.

20 Claims, 6 Drawing Sheets

(51) Int. Cl.
*G06F 8/71* (2018.01)
*G06F 8/65* (2018.01)

(56) References Cited

U.S. PATENT DOCUMENTS

| | | | |
|---|---|---|---|
| 5,755,174 A | 5/1998 | Freeman | |
| 5,986,576 A | 11/1999 | Armstrong | |
| 6,038,625 A * | 3/2000 | Ogino | H04L 12/40058 710/10 |
| 6,281,790 B1 * | 8/2001 | Kimmel | G08B 13/19608 340/506 |
| 6,288,637 B1 * | 9/2001 | Thomas | G08B 17/00 340/10.1 |
| 6,597,777 B1 * | 7/2003 | Ho | H04L 41/0896 370/235 |
| 6,970,183 B1 * | 11/2005 | Monroe | G08B 7/062 348/143 |
| 6,992,575 B2 * | 1/2006 | Reghetti | G06F 30/00 340/506 |
| 7,034,701 B1 * | 4/2006 | Rose-Pehrsson | G08B 17/00 340/521 |
| 7,623,026 B2 | 12/2009 | Martin et al. | |
| 8,315,237 B2 * | 11/2012 | Berger | H04W 4/90 370/338 |
| 9,147,337 B2 * | 9/2015 | Cohn | G08B 25/004 |
| 9,489,814 B1 * | 11/2016 | Pettigrew | H04L 12/40 |
| 9,513,364 B2 * | 12/2016 | Hall | H04L 67/02 |
| 9,851,982 B2 * | 12/2017 | Hall | G06F 9/4416 |
| 2002/0087665 A1 * | 7/2002 | Marshall | H04L 41/00 709/220 |
| 2005/0154566 A1 * | 7/2005 | Farrell | G06F 30/13 703/1 |
| 2007/0268294 A1 | 11/2007 | Eagen et al. | |
| 2009/0249129 A1 * | 10/2009 | Femia | G06F 11/008 714/47.2 |
| 2010/0232317 A1 * | 9/2010 | Jing | H04L 12/2807 370/254 |
| 2011/0210671 A1 | 9/2011 | Nielson | |
| 2012/0110150 A1 * | 5/2012 | Kosuru | H04L 41/082 709/221 |
| 2013/0024800 A1 * | 1/2013 | Sundriyal | G08B 25/14 715/772 |
| 2013/0219034 A1 * | 8/2013 | Wang | G06F 15/177 709/222 |
| 2013/0241419 A1 | 9/2013 | Ghafoori et al. | |
| 2013/0321161 A1 * | 12/2013 | Chen | G08B 17/00 340/628 |
| 2014/0270103 A1 * | 9/2014 | Karmakar | H04M 11/022 379/67.1 |
| 2015/0116991 A1 | 4/2015 | Miano | |
| 2016/0037839 A1 | 2/2016 | Vandenbosch et al. | |
| 2017/0286099 A1 * | 10/2017 | Wilkinson | H04L 67/34 |
| 2017/0301268 A1 | 10/2017 | Laforce et al. | |
| 2020/0044876 A1 * | 2/2020 | Piccolo, III | H04L 12/10 |

OTHER PUBLICATIONS

Second Communication pursuant to Article 94(3) EPC from related European Application No. 17180584, dated Jan. 31, 2019, 5 pages.
Extended European search report from corresponding EP application 17180584.9, dated Nov. 20, 2017.
English-language translation of PCT patent application WO 2011/023123 A1, publication date Mar. 3, 2011.

* cited by examiner

SYSTEMS AND METHODS FOR GENERATING A GRAPHICAL REPRESENTATION OF A FIRE SYSTEM NETWORK AND IDENTIFYING NETWORK INFORMATION FOR PREDICTING NETWORK FAULTS

PRIORITY INFORMATION

This application is a Continuation of U.S. application Ser. No. 15/257,253, filed Sep. 6, 2016, the contents of which are incorporated herein by reference.

FIELD

The present invention relates generally to fire system networks. More particularly, the present invention relates to systems and methods for generating a graphical representation of a fire system network and identifying network information for predicting network faults.

BACKGROUND

Interconnected fire systems are known in the art and typically include a plurality a plurality of components, such as high speed network communication modules (HSNCM), each of which is connected to one or two fire control panels to form a large network and connect geographically distributed buildings. Each fire control panel connected to a HSNCM can be considered a node of the HSNCM and can be connected to a plurality of fire alarm devices for controlling or monitoring the same.

With currently available diagnostic information in large networks, identifying a break from a node or a malfunctioning node can be a cumbersome process. For example, known systems and methods of identifying a break from a node or a malfunctioning node include using network set up diagrams to manually generate a topology map of the fire system network. However, identifying neighboring information for each node within the network requires a user to spend a huge amount of effort and time, which can result in expensive or inefficient maintenance and troubleshooting.

Some systems and methods for generating graphical representations of components in a fire system network are known in the art. However, no known systems and methods extract network parameters nodes in the network to automatically generate topology maps of the fire system network that can be used to identify a break from a node or a malfunctioning node.

In view of the above, there is a continuing, ongoing need for improved systems and methods.

DETAILED DESCRIPTION

Figure 1:
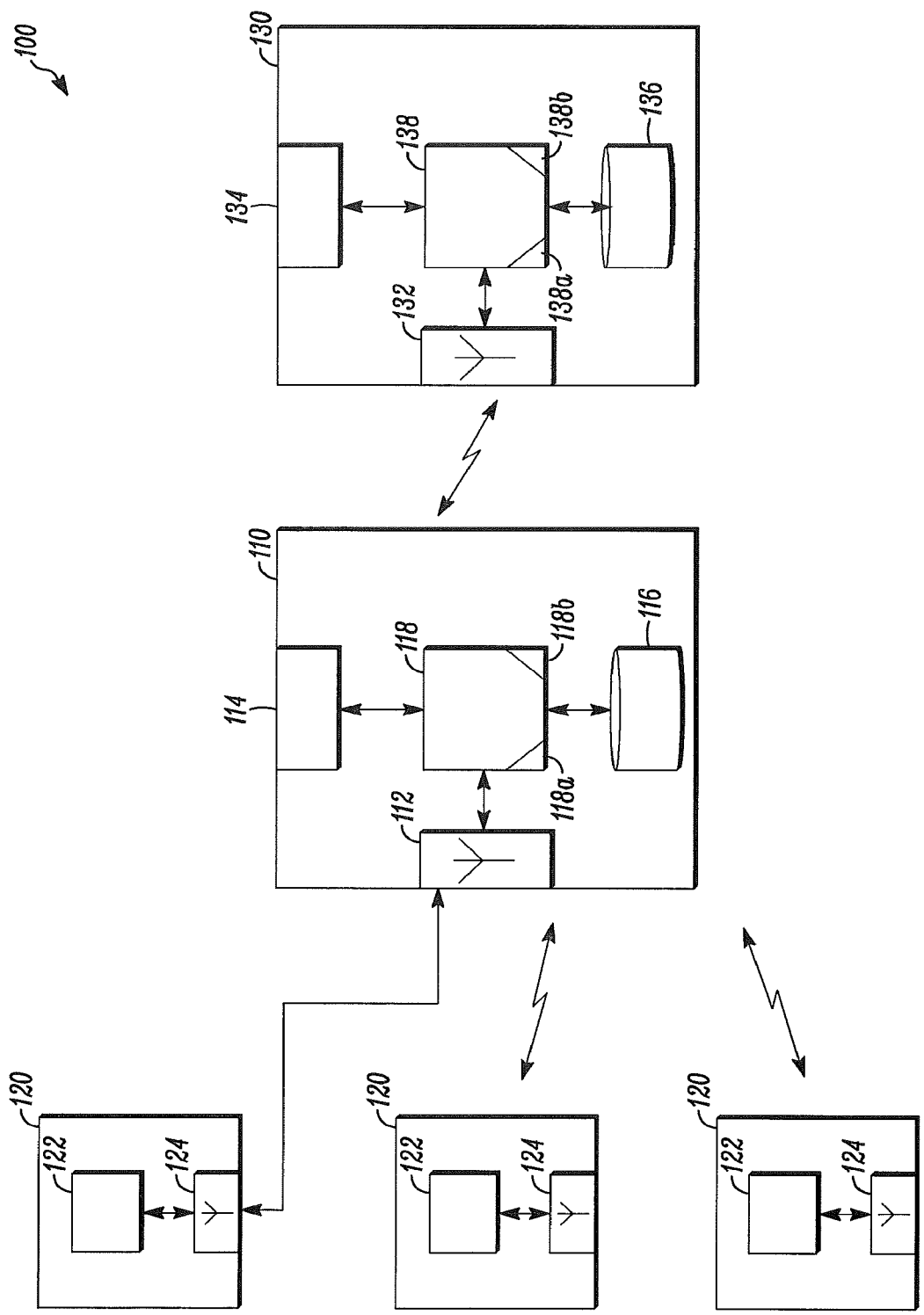
FIG. 1 is a block diagram of a system in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for generating a graphical representation of a fire system network and identifying network information for predicting network faults. For example, each node in a fire system network can include a network board that is connected to the network and that stores thereon information and data related to the node and the connections thereto or the associations or interfaces therewith. Systems and methods disclosed herein can extract at least some of the information and data that is stored on the network boards in the nodes of the fire system network and that is relevant to building a topology map of the network and use the extracted information and data to generate, pictorially and as a topology map, the graphical representation of the fire system network to visually identify the exact physical network connectivity structure of the network. In this manner, network parameters, such as the information and data extracted from the network boards, can be distributed throughout the network or to a fire system network interface component device.

In some embodiments, systems and methods disclosed herein can generate a topology map as disclosed and described herein in real time, and in some embodiments, systems and methods disclosed herein can generate a topology map as disclosed and described herein by reading hop counts in the network, thereby eliminating any need to manually check physical connections to draw a topology map. Furthermore, in some embodiments, systems and methods disclosed herein can generate a topology map as disclosed and described herein remotely and from any location without the need for a user to be physically present at or connected to the network, and in some embodiments, a topology map as disclosed and described herein can be extended to include loops, devices, or other sub-systems connected to or associated with the fire system network.

In some embodiments, the information and data stored on the network board of a node in the network can include, but is not limited to, for example, the style of the network, a classification of the board or the board generation, an identification of versions of the board's application, database, kernel, or boot loader, the physical interface type to and from the board (wired, fiber, etc.), and port connectivity information of the board, such as an identification of devices or other nodes connected to or associated or interfaced with the node.

In some embodiments, the information and data extracted from the network boards of the nodes in the fire system network can be considered network parameters, and at least some of these network parameters can be used to identify any incompatibility issues during installation of the fire system network. In some embodiments, the location of any incompatibility issues or a warning thereof can be displayed on a generated topology map.

In some embodiments, the graphical representation of the fire system network generated in accordance with embodiments disclosed herein can include the generated topology map embedded or integrated into or onto one or more building information models (BIM) of one or more buildings in which the network is deployed. Accordingly, the geographical location and distribution of network elements can be visually represented with respect to the location of physical building structures, which can assist a user in identifying an exact physical location of a fault or break in the fire system network, when necessary, or in identifying an exact physical location of a network device for testing and maintenance thereof.

In some embodiments, network parameters, including the information and data extracted from the network boards of the nodes in the fire system network, or generated topology maps can be uploaded to and stored on a local or remote cloud server device on demand, upon deployment of the network, or at predetermined regular interval times. In such embodiments, systems and methods disclosed herein can compare real time network parameters or topology maps with historically uploaded network parameters or topology maps to localize, identify, and graphically represent the position of any network faults, to prognosticate or predict the likely position of any network faults, to adaptively model the system to optimize performance, or to identify trends or patterns in network parameters, network faults, and load faults in the network. For example, when a real time network fault is identified, systems and methods disclosed herein can use the network parameters stored on the cloud server device to generate a topology map that graphically represents the physical network connectivity structure of the fire system network and the location of the identified network fault thereon. In some embodiments, systems and methods disclosed herein can identify a signal to noise ratio in the wiring between network nodes and display the identified ratios on the generated topology map or use the identified ratios to predict the likely position of any network faults.

In accordance with disclosed embodiments, a fire system network interface component device can be part of or coupled, wirelessly or via a wired connection, to one or more devices of the fire system network disclosed herein, including, for example, a HSNCM, a fire control panel, a fire alarm device, or any other node of the network as would be understood by one or ordinary skill in the art. Upon deployment of the network, at predetermined time intervals, or upon a user interface of the fire system network component interface device receiving user input to do so, the fire system network interface component device can obtain network parameters, information, or data extracted from network boards of the nodes in the fire system network as disclosed herein and generate and display, for example, on the user interface device, a topology map that graphically represents the physical network connectivity structure of the fire system network. In some embodiments, the user interface device can display at least some of the network parameters, including the information and data extracted from the network boards of the nodes in the fire system network. Furthermore, in some embodiments, the user interface device can receive additional user input, and responsive thereto, the fire system network interface component device can transition the displayed topology map to a variation thereof in accordance with the additional user input.

In some embodiments, a generated topology map can be uploaded to and stored on a local or remote cloud server device on demand, upon generation of the map, or at predetermined regular interval times for synchronization thereof. When the topology map stored on the server device is the first such map stored for a particular fire system network, the server device can identify the topology map as an original or reference topology map and can use the original or reference topology map to compare with later generated topology maps, such as real time topology maps, that are generated, for example, during the testing and maintenance of the fire system network. In some embodiments, such comparisons can be used to identify and localize changes in the network, such as a real time network fault. Furthermore, in some embodiments, systems and methods disclosed herein can use information and data extracted from the network boards of the nodes in the network map to graphically represent, on a real time topology map, network nodes and the neighbors thereof and compare the real time topology map with an original or reference topology map to visually identify any missing nodes that are not identified in real time or to identify the location of any break in the network.

FIG. 1 is a block diagram of a system 100 in accordance with disclosed embodiments. As seen in FIG. 1, the system 100 can include a fire system network component device 110 that is part of or coupled, via a wired or wireless connection, to one or more devices 120 of a fire system network. In some embodiments, a device 120 can include a HSNCM, a fire control panel, a fire alarm device, or any other node of a fire system network as would be understood by one of ordinary skill in the art. As further seen in FIG. 1, the fire system network component device 100 can also be in wired or wireless communication with a local or remote cloud server device 130.

Each of the devices 120 can include a network board 122 that can store information, data, and network parameters as disclosed and described above, and the fire system network component device 110 can extract at least some of the information, data, and network parameters from one or more boards 122 in the system 100 via respective transceiver devices 124 of the devices 120 and a transceiver device 112 of the device 110.

As seen in FIG. 1, each of the fire system network component device 110 and the local or remote cloud server device 130 can include a transceiver device 112, 132, a user interface device 114, 134, and a memory device 116, 136, each of which can be in communication with respective control circuitry 118, 138, one or more programmable processors 118a, 138a, and executable control software 118b, 138b as would be understood by one of ordinary skill in the art. The executable control software 118b, 138b can be stored on a transitory or non-transitory computer readable medium, including, but not limited to, local computer memory, RAM, optical storage media, magnetic storage media, flash memory, and the like.

In some embodiments, some or all of the control circuitry 118, 138, programmable processor 118a, 138a, and control software 118b, 138b can execute and control at least some of the methods described above and herein. For example, in some embodiments, some or all of the control circuitry 118, 138, programmable processor 118a, 138a, and control software 118b, 138b can use the information, data, and network parameters extracted from the network boards 122 of the devices 120 to generate one or more topology maps of the system 100 that graphically represents the network 100 and visually identifies the physical connectivity structure of the system 100, to identify and display any incompatibility issues within the system 100, to embed or integrate the generated topology map into or onto a BIM, or to store and compare real time network parameters or topology maps with historical network parameters or topology maps to localize, identify, and graphically represent the position of network faults, to prognosticate or predict the likely position of network faults, to adaptively model the system to optimize performance, or to identify trends or patterns in network parameters, network faults, and load faults in the system 100. In some embodiments, the BIM into or onto which the topology map is embedded or integrated can be stored in one or both of the memory devices 126, 136.

Figure 2A:
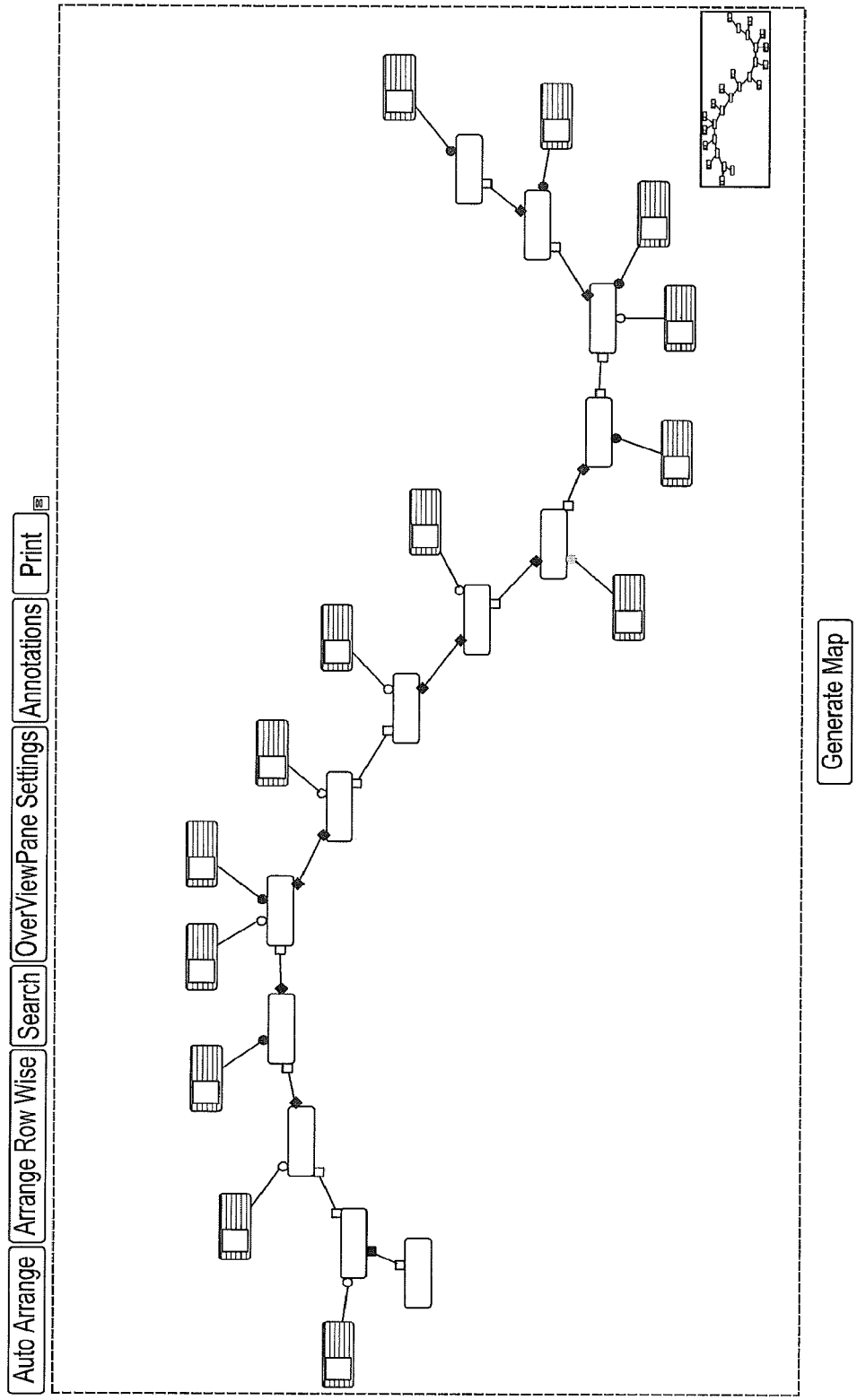
FIG. 2A illustrates a window displayed on a user interface device for graphically representing a generated topology map of a fire system network in accordance with disclosed embodiments.
Figure 2B:
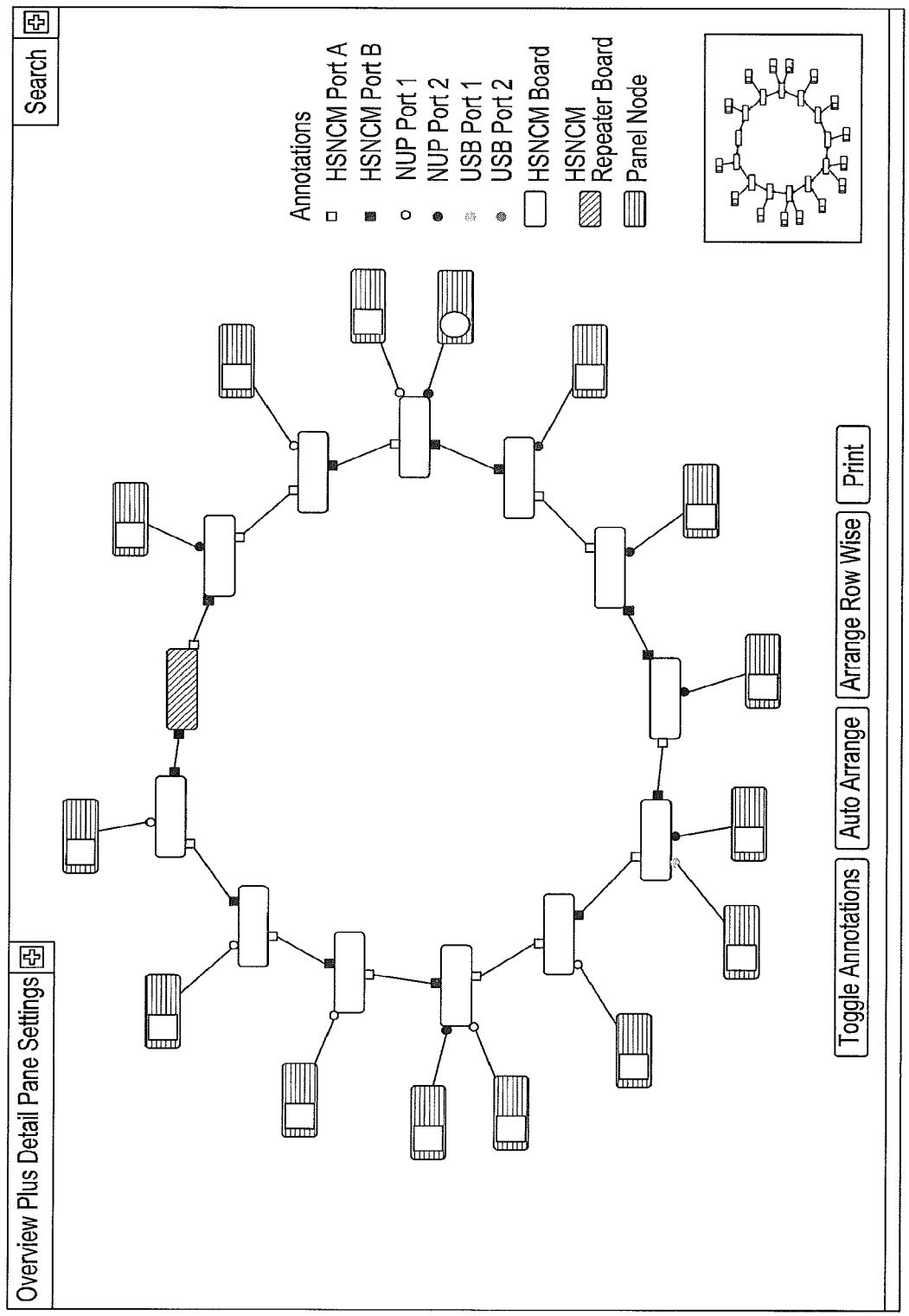
FIG. 2B illustrates a window displayed on a user interface device for graphically representing a generated topology map of a fire system network in accordance with disclosed embodiments.
Figure 2C:
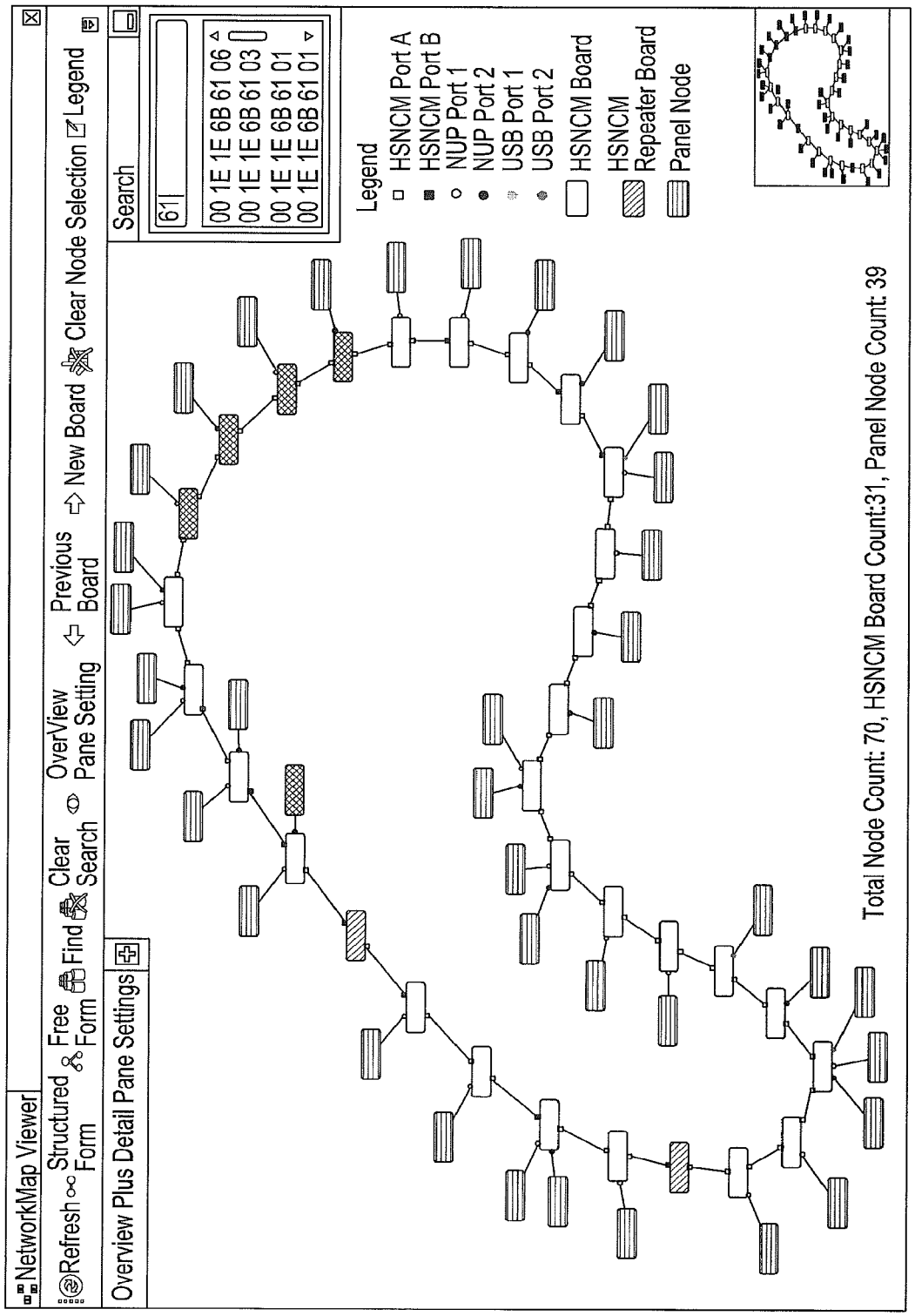
FIG. 2C illustrates a window displayed on a user interface device for graphically representing a generated topology map of a fire system network in accordance with disclosed embodiments.
Figure 2D:
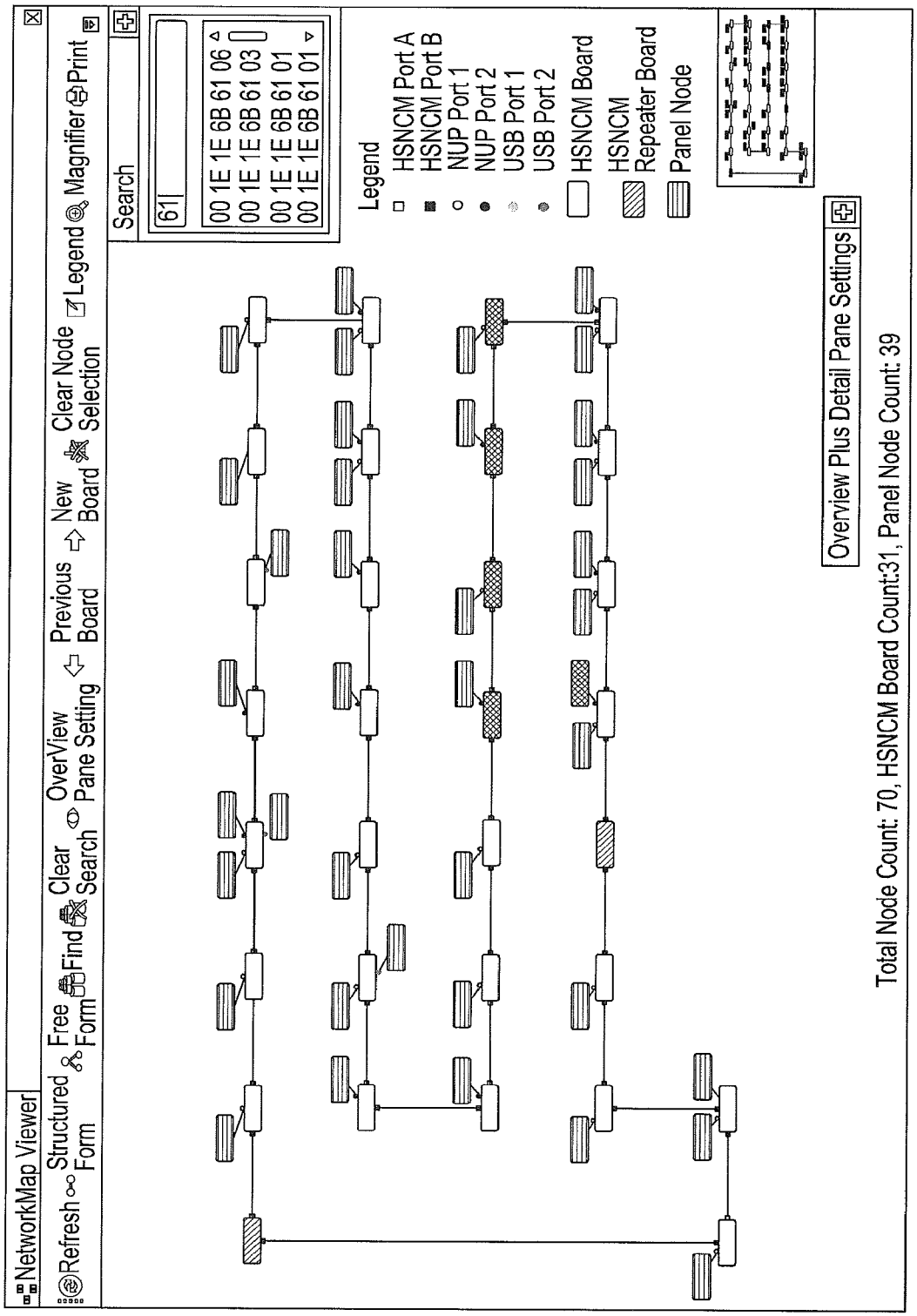
FIG. 2D illustrates a window displayed on a user interface device for graphically representing a generated topology map of a fire system network in accordance with disclosed embodiments.
Figure 2E:
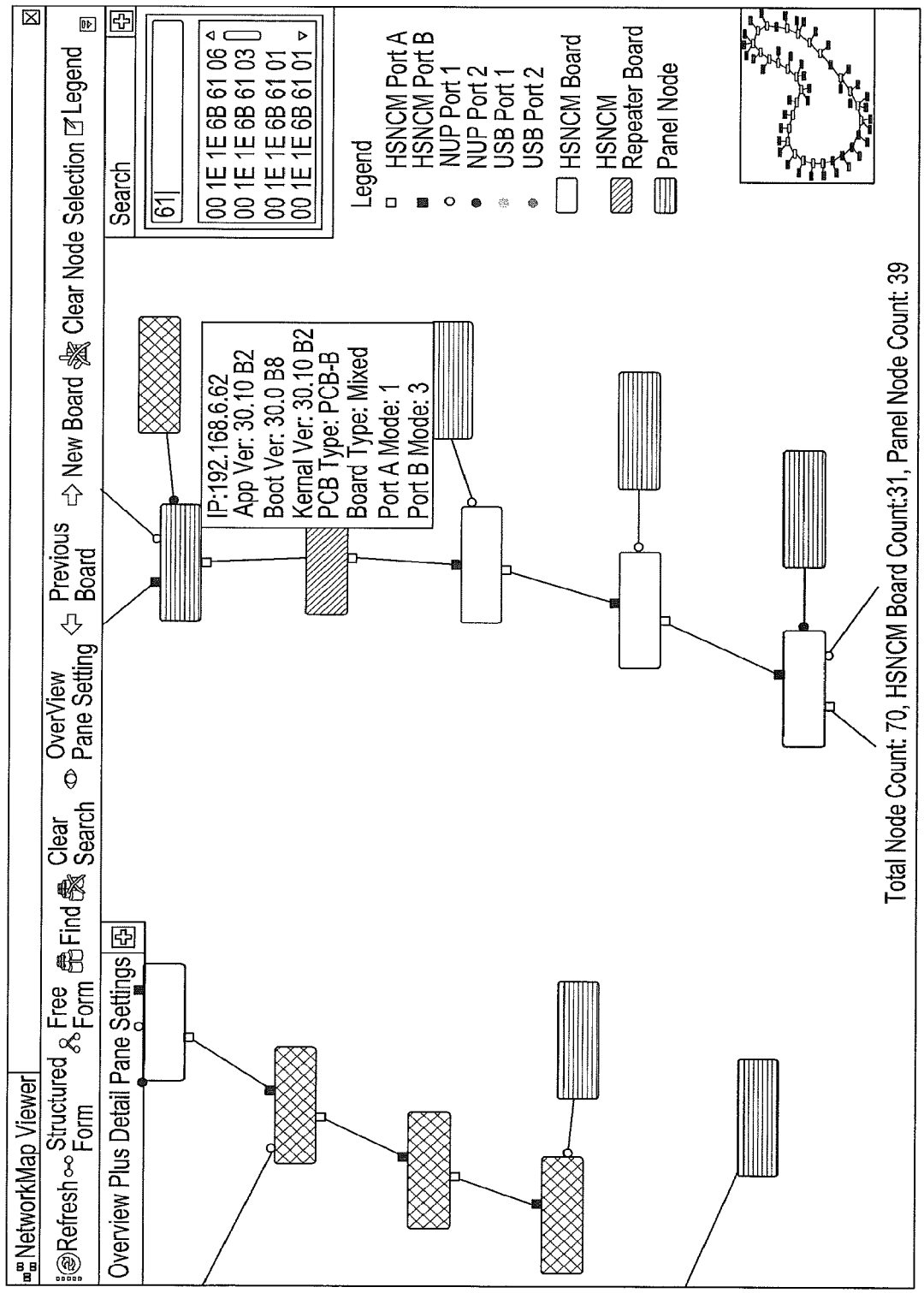
FIG. 2E illustrates a window displayed on a user interface device for graphically representing a portion of a generated topology map of a fire system network and extracted network parameters related thereto in accordance with disclosed embodiments.

In some embodiments, one or both of the user interface devices 114, 134 can receive user input, and, responsive thereto, some or all of the control circuitry 118, 138, programmable processor 118a, 138a, and control software 118b, 138b can cause the extraction of information, data, and network parameters from the network boards 122 of the devices 120, can cause the generation of one or more topology maps, or can cause the extracted information, data, and network parameters to be uploaded to the server device 130. For example, each of FIGS. 2A and 2E illustrates a window that can be displayed on one or both of the user interface devices 124, 134 that graphically represents a generated topology map, or a portion thereof, of a fire system network. As seen in FIG. 2E, in some embodiments, the displayed window can also display at least some of the information, data, and network parameters extracted from a network board of a node in the network.

Although a few embodiments have been described in detail above, other modifications are possible. For example, the logic flows described above do not require the particular order described, or sequential order, to achieve desirable results. Other steps may be provided, or steps may be eliminated, from the described flows, and other components may be added to, or removed from, the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method, comprising:
generating a first topology map that graphically represents a current physical connectivity structure of a plurality of nodes using at least one of a respective plurality of network parameters of each of the plurality of nodes;
using the respective plurality of network parameters of each of the plurality of nodes to identify incompatibility issues of at least one of the plurality of nodes during installation of a fire system network; and
displaying the incompatibility issues at corresponding locations on the first topology map.

2. The method of claim 1, further comprising generating the first topology map in real time to graphically represent the current physical connectivity structure of the plurality of nodes in real time.

3. The method of claim 1, further comprising embedding or integrating the first topology map into or onto a building information model of a building in which the fire system network is deployed.

4. The method of claim 1, further comprising transmitting the respective plurality of network parameters of each of the plurality of nodes or the first topology map to a cloud server device for storage thereon.

5. The method of claim 1, further comprising:
comparing a historical topology map that graphically represents a historical physical connectivity structure of each of the plurality of nodes with the first topology map; and
responsive to the comparing, graphically representing positions of any network faults on the first topology map.

6. The method of claim 5, further comprising transmitting the respective plurality of network parameters of each of the plurality of nodes or the first topology map to the cloud server device responsive to receiving user input, responsive to deployment of the fire system network, or at predetermined regular interval times.

7. The method of claim 1, further comprising extracting the respective plurality of network parameters from a respective network board of each of the plurality of nodes in the fire system network.

8. The method of claim 7, wherein the respective plurality of network parameters of each of the plurality of nodes includes at least one of a style of the fire system network, a respective classification or a respective generation of the respective network board, a respective identification of a respective version of a respective application, database, kernel, or boot loader of the respective network board, a respective physical interface type to and from the respective network board, and respective port connectivity information of the respective network board.

9. The method of claim 8, wherein the respective port connectivity information of the respective network board of each of the plurality of nodes includes a respective identification of other of the plurality of nodes connected to, associated with, or interfaced with a respective one of the plurality of nodes.

10. A system, comprising:
a transceiver device;
a memory; and
a programmable processor configured to execute executable instructions stored in the memory to:
generate a first topology map that graphically represents a current physical connectivity structure of a plurality of nodes using at least one of a respective plurality of network parameters of each of the plurality of nodes,
use the respective plurality of network parameters of each of the plurality of nodes to identify incompatibility issues of at least one of the plurality of nodes during installation of the fire system network, and
display the incompatibility issues at corresponding locations on the first topology map.

11. The system of claim 10, wherein the transceiver device transmits the respective plurality of network parameters of each of the plurality of nodes or the first topology map to a cloud server device for storage thereon.

12. The system of claim 11, wherein the transceiver device transmits the respective plurality of network parameters of each of the plurality of nodes or the first topology map to the cloud server device responsive to receiving user input, responsive to deployment of the fire system network, or at predetermined regular interval times.

13. The system of claim 10, further comprising a user interface device.

14. The system of claim 13, wherein the user interface device displays a graphical representation of positions of any network faults on the first topology map in response to a comparison of a historical topology map with the first topology map.

15. A non-transitory computer readable medium having computer readable instructions stored thereon that are executable by a processor to:
   generate a first topology map that graphically represents a current physical connectivity structure of a plurality of nodes using at least one of a respective plurality of network parameters of each of the plurality of nodes,
   use the respective plurality of network parameters of each of the plurality of nodes to identify incompatibility issues of at least one of the plurality of nodes during installation of the fire system network, and
   display the incompatibility issues at corresponding locations on the first topology map.

16. The computer readable medium of claim 15, wherein the instructions are executable by the processor to embed or integrate the first topology map into or onto a building information model of a building in which the fire system network is deployed.

17. The computer readable medium of claim 15, wherein the instructions are executable by the processor to generate the first topology map responsive to receiving user input, responsive to deployment of the fire system network, or at predetermined regular interval times.

18. The computer readable medium of claim 15, wherein the instructions are executable by the processor to generate the first topology map in real time to graphically represent the current physical connectivity structure of the plurality of nodes in real time.

19. The computer readable medium of claim 15, wherein the instructions are executable by the processor to compare a historical topology map that graphically represents a historical physical connectivity structure of the plurality of nodes with the first topology map.

20. The computer readable medium of claim 19, wherein, responsive to comparing the historical topology map that graphically represents the historical physical connectivity structure of the plurality of nodes with the first topology map, graphically representing positions of any network faults on the first topology map.

* * * * *